J. W. SMITH.
Improvement in Wagon Standards.

No. 120,115.　　　　　　　　　　　　Patented Oct. 17, 1871.

Witnesses:　　　　　　　　　　　Inventor:
G. Mathys.　　　　　　　　　　　J. W. Smith.
Thos. D. D. Durand　　　　　　Per
　　　　　　　　　　　　　　　　Attorneys.

UNITED STATES PATENT OFFICE.

JACOB W. SMITH, OF DIXON, IOWA.

IMPROVEMENT IN WAGON-STANDARDS.

Specification forming part of Letters Patent No. 120,115, dated October 17, 1871.

*To all whom it may concern:*

Be it known that I, JACOB W. SMITH, of Dixon, in the county of Scott and State of Iowa, have invented a new and Improved Wagon-Bolster and Stake; and I do hereby declare the following to be a full, clear, and exact description of the same, reference being had to the accompanying drawing making a part of this specification, in which—

Figure 1:
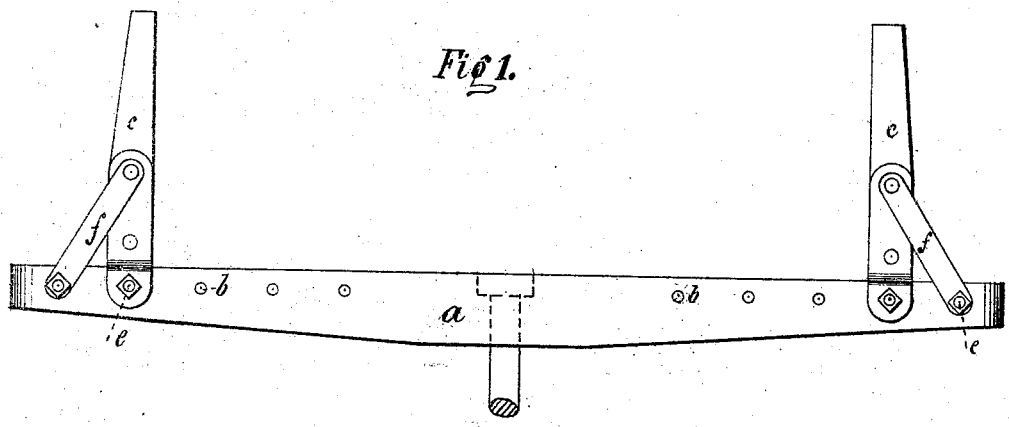
Figure 2:
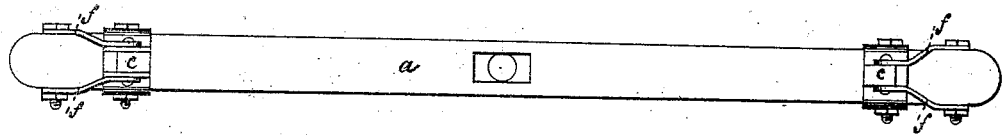

Figure 1 is a side elevation, and Fig. 2 is a top view.

This invention relates to an improvement in the class of bolsters having adjustable stakes; and it consists, mainly, in forming transverse perforations in a bolster to adapt the stake and brace-pins to be readily changed from one point to another, as required, to accommodate the varying quantity of material to be confined or secured between them while being transported.

Referring to the drawing, $a$ is the bolster, the same having a longitudinal series of transverse holes, $b$. The stakes $c$ have plates $d$ at their lower ends, which extend downward past the bolster at each side, through which plates, and also through the holes $b$, pass bolts $e$. The stakes are stayed by means of braces $f$, which are bolted at their lower ends to the bolster by bolts, also passing through the holes $b$.

This arrangement is very well adapted to hauling long wood, rails, logs, &c., which can be placed between the stakes. The bolts $e$ can be drawn out, the stake $c$ shifted as desired, and the bolts $e$ replaced. When hay-racks are used, which are generally considerably narrower than wagon-bodies, the stakes can be shifted inward to each side of the rack and there fastened so as to support the same.

Having thus described my invention, what I claim as new, and desire to secure by Letters Patent, is—

The stakes $c$ $c$ and braces $ff$, in combination with the bolster $a$ having a series of transverse perforations, as and for the purposes shown and described.

JACOB W. SMITH.

Witnesses:
J. K. JACKSON,
JEROME S. MELTAIR. (31)